United States Patent Office 3,536,584
Patented Oct. 27, 1970

3,536,584
STANDPIPE FOR NUCLEAR REACTORS
Everett Long and Peter John Rawson, Whetstone, England, assignors to The English Electric Company Limited, London, England, a British company
Filed Dec. 11, 1967, Ser. No. 689,388
Claims priority, application Great Britain, Dec. 9, 1966, 55,228/66
Int. Cl. G21c 13/00
U.S. Cl. 176—87                            7 Claims

ABSTRACT OF THE DISCLOSURE

A standpipe for a nuclear reactor comprises two coaxial tubes with spacer bars between them. The spacer bars are in intimate contact with both tubes so that they act as load-bearing members, and are preferably arranged to guide coolant through the interspace between the walls for cooling the standpipe. In one method of manufacture, the inner tube is expanded on to the bars.

---

This invention relates to nuclear reactor access arrangements, comprising at least one standpipe arranged to be mounted in the concrete biological shield of a nuclear reactor for giving access through a wall of said shield to the fuel-containing reactor core within said shield, and a removable standpipe plug associated with the or each said standpipe. Standpipes and plugs forming part of such arrangements are included in the scope of the invention.

The term biological shield includes for example a combined biological shield and pressure vessel of prestressed concrete. Standpipes penetrating a wall or pile cap of such a shield must withstand internal fluid pressure within the pressure vessel and also external pressure from the prestressed concrete. The latter is especially true when the internal fluid pressure is relieved, so that the external pressure tends to collapse the standpipe.

It is also necessary to prevent the standpipes acting as conductors for heat which might raise the temperature of the concrete above a safe value. The standpipes must therefore be suitably insulated and/or cooled, at least when the reactor is in operation.

A further requirement is that the radial thickness of the standpipe wall should be as small as possible, so as to allow the smallest possible pitch to be achieved between standpipes. This is particuarly important as reactor cores become smaller for a given power output; and since there are usually a large number of standpipes in a reactor, a reduction of even half an inch in the pitch may effect a considerable saving in space.

According to the invention, a standpipe for a nuclear reactor, arranged to be mounted in the concrete biological shield of the reactor for giving access through a wall of said shield to a fuel-containing reactor core within said shield, comprises an outer tube spaced coaxially from an inner tube so as to define an annular space therebetween, by a plurality of bars which are in intimate contact with both said tubes so that said bars and tubes together constitute a composite load-bearing structure, said annular space being closed at both ends thereof.

According to a preferred feature of the invention, said bars are so arranged as to form a path for a fluid to flow between them.

Preferably, each said bar is held in intimate compressive load-bearing contact between said tubes.

According to another preferred feature of the invention, a thin metallic sleeve, substantially thinner than said inner tube, is spaced coaxially within the inner tube, over at least part of the length of the inner tube, so as to reduce transverse heat flow therethrough.

According to a further preferred feature of the invention, the lower end of the standpipe is fixed to an axial standpipe extension, which extends towards the reactor core, by means of a joining sleeve fixed coaxially to both said extension and standpipe and restrained against axial movement relative thereto so as to act as a tensile load-bearing member.

According to yet another preferred feature of the invention, a standpipe plug for insertion in the end of a standpipe according to the invention has a circumferential convection-inhibiting ring comprising a circumferential channel member fixed around the plug and a further channel member embracing said circumferential channel member loosely, said further channel member being arranged with its back facing outwardly so as to bear against the bore of the standpipe.

Various embodiments of the invention will now be described by way of example and with reference to the accompanying drawings, of which:

Figure 1:
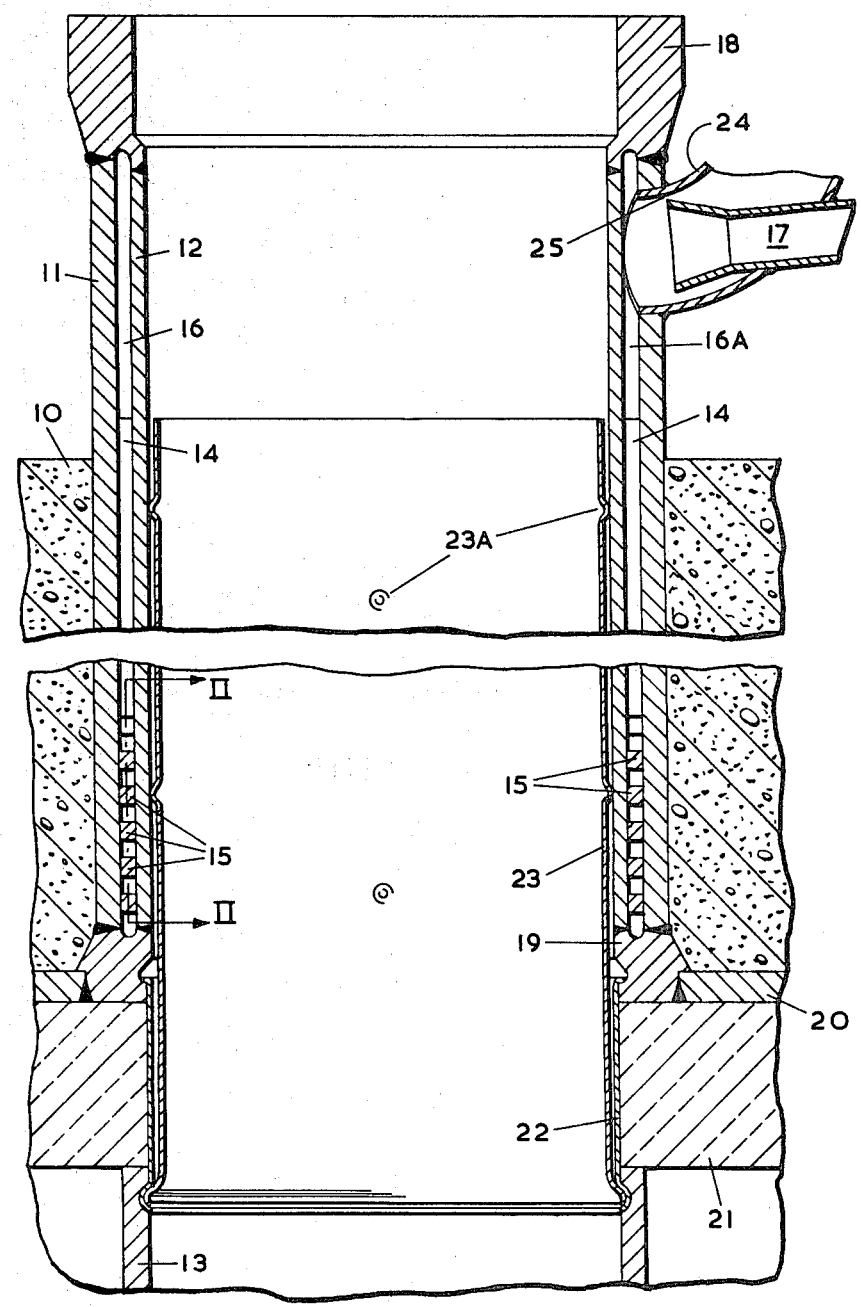
FIG. 1 is a sectional elevation showing a standpipe according to a preferred form of the invention.

With reference to FIG. 1, a standpipe, penetrating the prestressed concrete pile cap, i.e. roof, 10 of a combined pressure vessel and biological shield of a nuclear reactor, comprises essentially an outer and an inner cylindrical tube 11 and 12 respectively. The outer tube 11 is preferably stronger than the inner tube 12, for which purpose it is thicker than the inner tube 12 and/or has a higher yield point, and its function is primarily to withstand external forces imposed by the concrete. The inner tube 12 primarily withstands forces imposed by the pressure of reactor coolant gas reaching it from the reactor core (not shown), which is below the standpipe, through a standpipe extension tube 13 which extends down to the said core.

Figure 2:
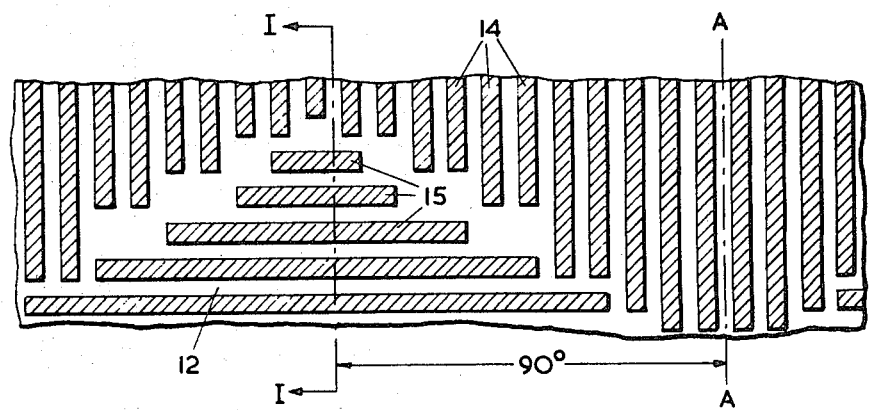
FIG. 2 is an "unfolded" sectional view taken on the line II—II of FIG. 1 and illustrating more clearly the arrangement of spacing bars incorporated in the standpipe of FIG. 1, FIG. 1 being sectioned on the line I—I of FIG. 2.

The tubes 11 and 12 are separated by a plurality of longitudinal bars 14 and some part-circumferential bars 15. A typical arrangement of bars 14 and 15 is shown more clearly in FIG. 2, in which the inner tube 12 is shown "unfolded" flat for convenience, the distance between the lines I—I and A—A representing a quarter of the circumference, subtended by an angle of 90° at the axis of the standpipe. The bars 14 and 15 subdivide the annular space 16 between the tubes 11 and 12 into a number of flow paths for cooling water, which is introduced to the space 16A through a pipe 17 near the top of the standpipe, and extracted by means of a similar pipe (not shown), which is also near the top of the standpipe. The upper part 16A of the space 16, above the bars 14, forms a header for this water.

At the top and bottom ends of the standpipe the tubes 11 and 12 are welded to annular end pieces 18, 19 respectively, which also close off the top and bottom of the annular space 16. The bottom end piece 19 is joined to a pressure-tight steel liner 20 of the pressure vessel.

A thick layer of thermal insulation 21 is provided against the liner 20 and held in place by the ends of the standpipe extensions 13 and by sleeves 22, each sleeve 22 being swaged (or fixed by other suitable means) to the appropriate lower end piece 19 and standpipe extension tube 13 so as to join them together. The top end of each sleeve 22 is free to move upwards a limited amount due to thermal expansion.

A thin stainless steel liner 23 is fixed at its bottom end within the standpipe extension tube 13 and extends coaxially and upwardly inside the inner tube 12 of the standpipe, being spaced from the latter by dimples 23A formed in the liner 23 (or by other suitable means) so as to allow thermal expansion and contraction of the liner 23 relative to the inner tube 12.

Normally the top end of the standpipe is closed by a standpipe plug (not shown in FIG. 1) which is removed by a fuelling or servicing machine when access is required to the reactor core through the standpipe. When such a machine is placed over the standpipe for removing hot fuel elements from the reactor, it is necessary to provide additional cooling for the standpipe. This is done by pumping additional cooling-water through a pipe 24 (which is normally closed by closing means not shown) from the machine or other alternative source. In the preferred form shown in FIG. 1, the pipe 17 exhausts into the pipe 24, between the outlet end thereof and the said closing means.

Figures 3, 4:
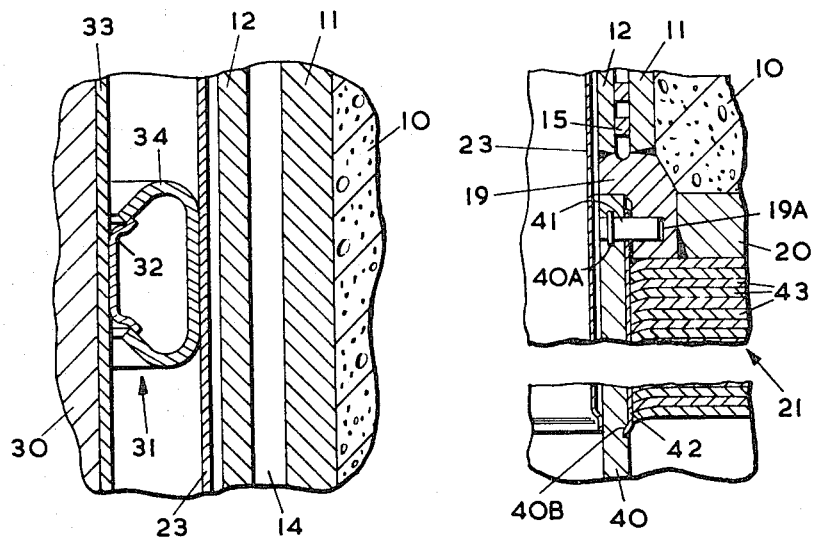
FIG. 3 is an enlarged sectional elevation showing a convection-inhibiting ring on a standpipe plug in position in a standpipe according to the invention.
FIG. 4 is a sectional elevation showing a modification of the arrangement shown in FIG. 1.

FIG. 3 shows part of a standpipe plug 30 in position in the standpipe. To inhibit convection of coolant gas in the standpipe, the plug 30 is fitted with one or more rings 31 comprising a circumferential channel member 32 fixed to a thin outer sleeve 33 of the plug 30, and a second channel member 34 which embraces the member 32 loosely and which is urged outwardly by its own resilience so that its back lies against the bore of the standpipe (in this case the liner 23). Such a ring is found to cause considerably less radial stress to the bore of the standpipe than, say, a rigid or spring-mounted piston ring—though such rings could be used in cases where this consideration is unimportant—and has a low frictional resistance to axial movement of the plug 30 in the standpipe.

FIG. 4 shows a modified form of joint between the standpipe and standpipe extension tube. In this case the standpipe extension tube, indicated at 40, is joined to the lower end piece 19 of the standpipe by a radial pin 41 which is forcibly deformed into an annular groove 40A in the extension tube wall to hold the pin in position therein. The pin 41 engages a hole 19A in the lower end piece 19. Tensile loads are carried by a sleeve 42 arranged closely around the top of the extension tube 40 adjacent the insulating layer 21, below which the sleeve 42 is deformed over a shoulder 40B on the tube 40. The top end of the sleeve 42 is transfixed by the pin 41.

The insulation 21 may for example comprise a number of stainless steel laminations 43, bent downwardly at the edges adjacent the standpipe extension so as to support the laminations in position, as shown in FIG. 4.

The cooling water inlet pipe 17 (FIG. 1) has a flared mouth with a narrow annular gap 25 around this mouth within the pipe 24 so as to ensure a high velocity at this point whilst additional cooling is being provided for refuelling as described above. This is also to ensure good pressure recovery as the coolant enters the annular space 16, and to reduce or eliminate the possibility of back flow into the cooling-water pipe 17.

In a preferred method of making a standpipe according to the invention, the bars 14, 15 are tack-welded at their centre points to the ouside of the inner tube 12, which is then placed in position in the outer tube 11 and expanded by fluid pressure until the bars 14, 15 are held compressively in intimate load-bearing contact with both tubes 11 and 12, i.e. until the elastic recovery of the outer tube 11, on release of the fluid pressure, exceeds that of the inner tube 12. Support of the inner tube 12 during the expansion process, in the part adjacent the header space 16A, can be provided for example by fusible bars, by fluid pressure or by loose pieces which can later be forcibly removed. Alternative methods of manufacture would be mechanical expansion by an expanding mandrel, explosive forming methods or other suitable means.

The bars 14, 15 may be arranged so that the cooling-water path defined thereby is a single-flow path, the water being extracted by a pipe at the bottom end; or double-flow as in the example described, in which the water is extracted at the end top of the annular space 16A. The main direction of the flow path need not be longitudinal: for example, some or all of the bars could be arranged helically or part-helically. Any desired flow path can be made by a suitable arrangement and shape of different bars or strips.

We claim:
1. A standpipe for a nuclear reactor, mounted in the concrete biological shield of the reactor for giving access through a wall of said shield to a fuel containing reactor core within said shield, comprising an outer tube spaced coaxially from an inner tube, so as to define an annular space therebetween, by a plurality of bars which are in intimate contact with both said tubes so that said bars and tubes together constitute a composite load-bearing structure, said annular space being closed at both ends thereof, wherein said bars are so arranged as to form a path for a cooling fluid to flow between them, first inlet means and outlet means for said coolant communicating with said annular space, and further inlet means comprising a pipe for supplying extra coolant to said annular space, the outlet end of said first inlet means being arranged within the outlet end of the said pipe.

2. A standpipe according to claim 1, wherein each said bar is held in intimate compressive load-bearing contact between said tubes.

3. A standpipe according to claim 1, including a metallic sleeve, substantially thinner than said inner tube, spaced coaxially within said inner tube over at least part of the length of the inner tube so as to reduce transverse heat flow therethrough.

4. A standpipe according to claim 3, wherein said sleeve is arranged for axial movement in the inner tube in response to thermal expansion or contraction.

5. A standpipe according to claim 1, in which the lower end of the standpipe is fixed to an axially-extending standpipe extension, which extends towards the reactor core, by means of a joining sleeve fixed coaxially to both said extension and standpipe and restrained against axial movement relative thereto so as to act as a tensile load-bearing member.

6. An access arrangement comprising at least one standpipe according to claim 1 and a removable standpipe plug arranged for insertion in the or each standpipe through the end thereof outside the biological shield, wherein the or each said plug has a circumferential convection-inhibiting ring comprising a circumferential channel member fixed around the plug and a further channel member embracing said circumferential channel member loosely, said further channel member being arranged with its back facing outwardly so as to bear against the bore of the standpipe.

7. A standpipe plug arranged for insertion in the end of a standpipe according to claim 1, having a circumferential convection-inhibiting ring comprising a circumferential channel member fixed around the plug and a further channel member embracing said circumferential channel member loosely, said further channel member being arranged with its back facing outwardly so as to bear against the bore of the standpipe.

References Cited

UNITED STATES PATENTS

| | | | |
|---|---|---|---|
| 813,918 | 2/1906 | Schmitz | 138—143 X |
| 1,677,714 | 7/1928 | Frease | 138—148 X |
| 1,930,285 | 10/1933 | Robinson | 138—143 |
| 3,167,204 | 1/1965 | Rouse | 138—148 X |

FOREIGN PATENTS 1,381,532 11/1964 France.
1,458,816 10/1966 France.

REUBEN EPSTEIN, Primary Examiner

U.S. Cl. X.R.

176—30, 58; 138—89, 153, 148